(12) United States Patent
Shimizu (10) Patent No.: US 7,386,872 B2
(45) Date of Patent: Jun. 10, 2008

(54) NETWORK STORAGE TYPE VIDEO CAMERA SYSTEM

(75) Inventor: Seiya Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1168 days.

(21) Appl. No.: 10/033,210

(22) Filed: Dec. 28, 2001

(65) Prior Publication Data

US 2003/0007785 A1    Jan. 9, 2003

(30) Foreign Application Priority Data

Jul. 4, 2001    (JP) ............................. 2001-204113

(51) Int. Cl.
*H04N 7/173* (2006.01)
*H04N 5/225* (2006.01)
*H04N 9/04* (2006.01)
*H04N 5/232* (2006.01)

(52) U.S. Cl. .............. 725/105; 348/207.1; 348/207.99; 348/211.1; 348/211.3

(58) Field of Classification Search ................ 725/105; 348/211.3, 211.1, 207.99, 207.1, 207.11
See application file for complete search history.

(56) References Cited

U.S. PATENT DOCUMENTS

| 5,553,083 A | * | 9/1996 | Miller ........................ 714/748 |
| 6,564,380 B1 | * | 5/2003 | Murphy ........................ 725/86 |
| 6,587,985 B1 | * | 7/2003 | Fukushima et al. ......... 714/748 |
| 6,850,559 B1 | * | 2/2005 | Driessen et al. ............ 375/219 |
| 6,978,306 B2 | * | 12/2005 | Miller et al. ................ 709/226 |

FOREIGN PATENT DOCUMENTS

JP    10-336651    12/1998

* cited by examiner

*Primary Examiner*—Lin Ye
*Assistant Examiner*—Richard M Bemben
(74) *Attorney, Agent, or Firm*—Katten Muchin Rosenman LLP (57) ABSTRACT

A network storage type video camera system enables to perform real-time recording and live distribution concurrently. The network storage type video camera system includes camera terminal equipment for generating moving image data; a network; and a moving image storage server connected to the camera terminal equipment through the network, wherein the camera terminal equipment converts the generated moving image data into packets to transmit in real time to the moving image storage server; the moving image storage server stores received packets and then reports reception packet information on the received packets to the camera terminal equipment; and further, after real-time transmission of the packets is completed, the camera terminal equipment supplies one or more lost packets having been lost during the transmission to the moving image storage server, so as to complement the lost packets according to the reported reception packet information.

5 Claims, 11 Drawing Sheets

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| V | P | X | CSRC COUNT | | | | M | PAYLOAD TYPE | | | | | | | | SEQUENCE NUMBER | | | | | | | | | | | | | | | |
| TIME STAMP | | | | | | | | | | | | | | | | | | | | | | | | | | | | | | | |
| (SSRC) IDENTIFIER | | | | | | | | | | | | | | | | | | | | | | | | | | | | | | | |
| (CRSC) IDENTIFIER | | | | | | | | | | | | | | | | | | | | | | | | | | | | | | | |
| PAYLOAD (REAL-TIME · DATA) | | | | | | | | | | | | | | | | | | | | | | | | | | | | | | | |

FIG. 9

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0|        PADDING        |       TIME STAMP : T a              |      SEQUENCE NUMBER : S a        |
```

FIG. 10

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0|        PADDING        |       TIME STAMP : T b              |      SEQUENCE NUMBER : S b        |
```

FIG. 11

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|1|        PADDING        |       TIME STAMP : T c              |      SEQUENCE NUMBER : S c        |
```

NETWORK STORAGE TYPE VIDEO CAMERA SYSTEM

FIELD OF THE INVENTION

The present invention relates to a network storage type video camera system in which video images and/or voice data captured by a video camera are transmitted through a wireless or wired communication network to store into a server connected to the network, and more particularly a network storage type video camera system which enables to restore the moving image data having been recorded by the video camera but partly being lost on the way to store into the server.

BACKGROUND OF THE INVENTION

With the improved technologies on moving image data compression and hardware devices, recently commercial equipment for handling digital moving images has been increasing in number. Among such equipment, there is one type having a large capacity hard disk (HDD) for storing a large amount of moving image data, enabling to extend recording time. Another type provides a flash memory as a storage medium having a capacity of several tens of megabytes, mainly aiming at miniaturization.

In the former type, it is difficult to miniaturize the equipment because of the HDD size, while in the latter type there is a disadvantage of limited image recording time. When extending the recording time is intended in the latter type, it is necessary to raise compression rate at the cost of image quality. Therefore, each of the types has the own merit and demerit.

In order to satisfy both requirements of miniaturization and elongation of recording time, there is one solution that the recorded images be stored not into a recording device included in the equipment itself, but into a recording device provided outside the equipment being connected with communication means. Provision of recording device outside the equipment (or 'terminal') facilitates to miniaturize the camera terminal, and at the same time to obtain extended recording time by storing into a recording device having a sufficiently large capacity.

When using a less reliable network with relatively frequent bit errors such as a wireless network, packet transmission technology can be applied to achieve accurate data transmission. The data are packetized and arrival of the packet data is monitored at both communication ends. When a packet is not received, retransmission processing is performed. Using such a method, it is required to provide a means for guaranteeing data identity between the data to be transmitted and the data actually received on the other side.

A known technology to enable the above means is ARQ (automatic repeat request). Data are divided into frames to transmit, and retransmission request is issued when a received frame includes an error, thus an error free scheme is realized.

However, in the ARQ retransmission processing, there is a problem that when packet loss occurs frequently, the packets triggered by the retransmission processing are retransmitted frequently through the network, which produces undesirable influence to the transmission bandwidth for normal data packets. In some cases network congestion may occur, resulting in stoppage of normal data transmission. Therefore, the ARQ method is regarded as not a proper means for real-time data transmission.

In particular, digital moving image data created by a digital video camera are generated in real time and continuously. Accordingly, to say nothing of the extreme case of network congestion, when real-time data transmission is impeded, data being unable to transmit must be kept in the camera terminal. Such communication bottleneck may cause stoppage of further recording.

To the contrary, if a priority is given to guaranteeing real-time data transmission at the cost of data accuracy, one method is to suppress retransmission of lost packets so as to circumvent the communication problem. However, when using this method, it is not possible to regenerate accurate moving image using data stored in the network server because of the inaccurate transmission and storage. Thus complete recording function of moving images, which is a basic requirement to a digital video camera, cannot be achieved.

SUMMARY OF THE INVENTION

Accordingly, it is an object of the present invention to provide a network storage type video camera system for storing moving image data into a server connected to a network, enabling to store the moving image data in real time even the server is connected to a less reliable network, and at the same time enabling to regenerate complete image data to be stored into the server.

In order to solve the aforementioned problem, according to a first aspect of the present invention, a network storage type video camera system includes camera terminal equipment for generating moving image data; a network; and a moving image storage server connected to the camera terminal equipment through the network. The camera terminal equipment converts the generated moving image data into packets to transmit in real time to the moving image storage server; the moving image storage server stores received packets and then reports reception packet information on the received packets to the camera terminal equipment; and further, after real-time transmission of the packets is completed, the camera terminal equipment supplies one or more lost packets having been lost during the transmission to the moving image storage server, so as to complement the lost packets according to the reported reception packet information.

According to a second aspect of the present invention, a network storage type video camera system includes camera terminal equipment for generating moving image data; a network; and a moving image storage server connected to the camera terminal equipment through the network. The camera terminal equipment converts the generated moving image data into packets to transmit in real time to the moving image storage server; the moving image storage server stores received packets and then reports reception packet information on the received packets to the camera terminal equipment; and further, in parallel with the real-time packet transmission, the camera terminal equipment supplies through another channel route one or more lost packets having been lost during the transmission to the moving image storage server, so as to complement the lost packets according to the reported reception packet information.

According to a third aspect of the present invention, in the network storage type video camera system of the first and second aspect of the present invention, the moving image storage server restores the moving image data using both the packets being stored during the real-time packet transmission and the lost packets being supplied from the camera terminal equipment after the real-time transmission is completed.

According to a fourth aspect of the present invention, in the network storage type video camera system of the first aspect of the present invention, the camera terminal equipment further includes a drive mechanism for receiving a memory medium to store the packets being supplied to the moving image sever after completion of the real-time packet transmission to complement the lost packets having been lost during the real-time transmission. Also, the moving image storage server further includes a drive mechanism for receiving the memory medium to read in the stored packets being supplied to complement the lost packets having been lost during the real-time transmission.

According to a fifth aspect of the present invention, in the network storage type video camera system of the first or second aspect of the present invention, the camera terminal equipment includes a storage means for storing packets for real-time transmission, from which lost packets to be supplied after the completion of the real-time packet transmission are obtained by deleting from the storage means the packets having been received by the moving image storage server according to the reception packet information reported from the moving image storage server.

According to a sixth aspect of the present invention, in the network storage type video camera system of the fifth aspect of the present invention, the camera terminal equipment includes a user interface for inputting an image capture order from a user. And a residual image recording time is estimated based on residual storage capacity of the camera terminal equipment, residual packet storage capacity of the moving image storage server, and the past record on both data transmission rate and data loss rate in the network, to display the residual image recording time onto the user interface.

According to a seventh aspect of the present invention, in the network storage type video camera system of the sixth aspect of the present invention, the estimation of residual recording time A(T) is derived from the following formula:

$$A(T)=MIN(As(T),Ac(T))$$

where $$As(T)=Rs(T)/(Ps(T)-Pl(T)),$$

$$Ac(T)=Rc(T)/Pl(T),$$

and,

Rc (T): residual storage capacity of the camera terminal equipment (bytes),

Rs (T): residual packet storage capacity of the moving image storage server (bytes), Ps (T): number of transmission bytes to be transmitted within a predetermined period up to the time T in the network (bytes/sec), Pl (T): quantity of data loss rate in the network (bytes/sec).

According to a eighth aspect of the present invention, in the network storage type video camera system of the third aspect of the present invention, a moving image regeneration terminal is connected to the moving image storage server through a network, to distribute to the moving image regeneration terminal a moving image being stored during the real-time recording, and to distribute a restored moving image having no loss after the recording is completed.

Further scopes and features of the present invention will become more apparent by the following description of the embodiments with the accompanied drawings.

DETAILED DESCRIPTION OF THE PREFERRED EMBODIMENTS

The preferred embodiments of the present invention are described hereinafter referring to the charts and drawings, wherein like numerals or symbols refer to like parts.

Prior to the description of the present invention, an example of an aforementioned conventional system is explained referring to the drawings, for the sake of easier understanding of the present invention.

[A System Example Guaranteeing Real-Time Transmission]

Figure 1:
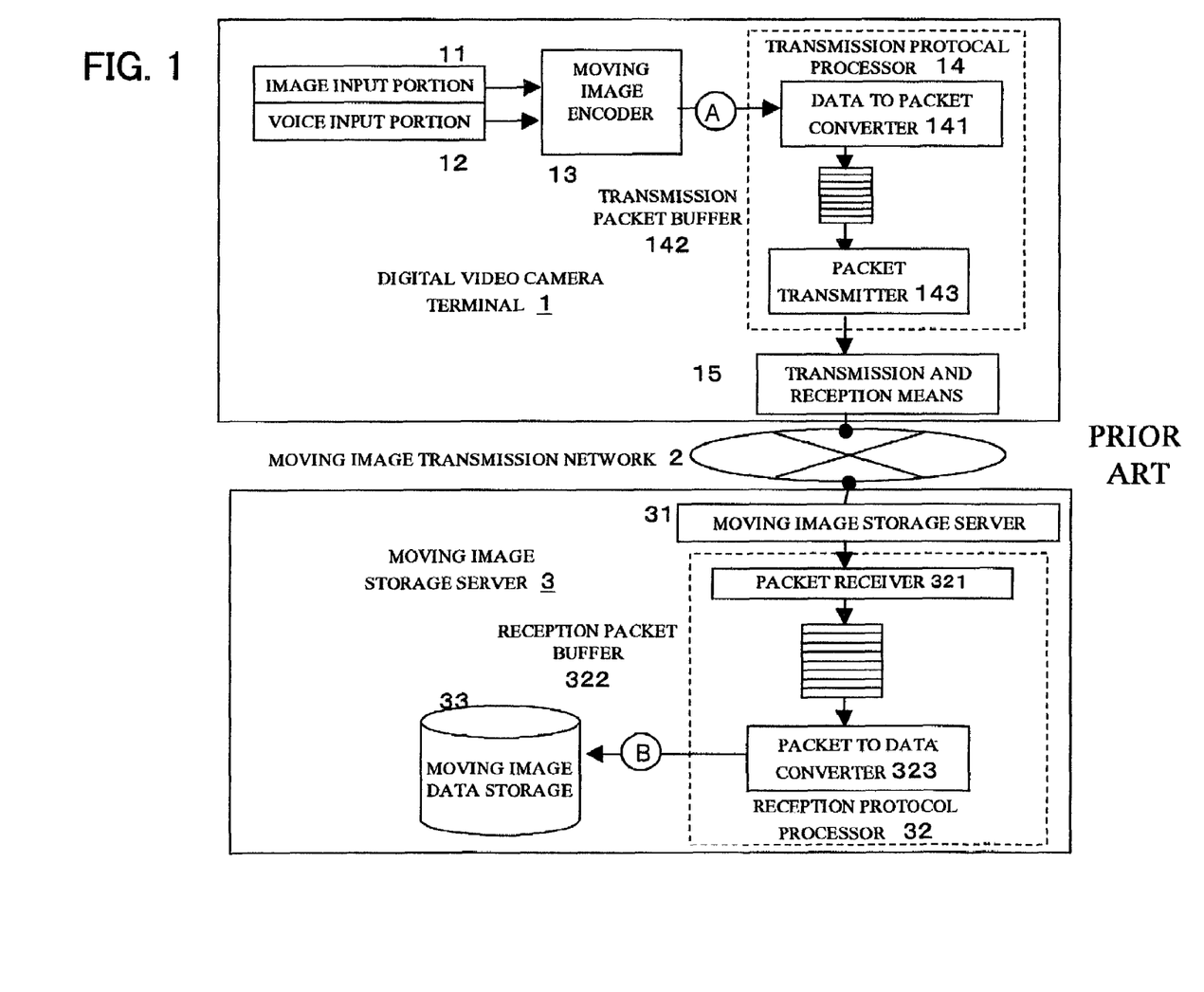
FIG. 1 shows a diagram illustrating an example of a network server storage system for moving images obtained by combining existing technologies.

In FIG. 1, there is shown an example of a network server storage system for storing moving images constituted by combining existing technologies. In this figure, digital video camera terminal 1 is connected to moving image storage server 3 through a moving image transmission network 2.

In the system configuration shown in FIG. 1, an emphasis is laid on real-time transmission between digital video camera terminal 1 and moving image storage server 3. In this example, data accuracy stored in moving image storage server 3 is not completely guaranteed.

In FIG. 1, a moving image encoder 13 in digital video camera terminal 1 encodes image and voice data respectively input from an image input portion 11 and a voice input portion 12 into compressed moving image data to forward to transmission protocol processor 14.

Image input portion 11 is a camera device having an imaging element such as CCD and CMOS. Voice input portion 12 includes a microphone, an analog-to-digital converter, etc. In moving image encoder 13, both voice data and image data are compressed into binary data having a moving image compression format such as MPEG4.

Transmission protocol processor 14 and a reception protocol processor 32 provided in moving image storage server 3 handles a real-time data transmission protocol to transmit data without retransmission of lost data. Such a real-time data transmission protocol can be configured, for example, using the combination of RTP (real-time transport protocol) and UDP (user datagram protocol) being included in the Internet Protocol.

Transmission protocol processor 14 includes a data to packet converter 141 for converting data into a packet, a transmission packet buffer 142, and a packet transmitter 143. Data to packet converter 141 converts encoded binary data into a packet format defined by the transmission protocol, to store into transmission packet buffer 142.

Transmission packet buffer 142 has a FIFO (first in, first out) structure. Packet transmitter 143 reads out the oldest packet from transmission packet buffer 142 to transmit to network 2 through a transmission and reception means 15.

Meanwhile, in moving image storage server 3, a transmission and reception means 31 receives a packet transmitted through network 2, and a reception protocol processor 32 converts the received packet into binary data to store into a moving image storage 33. Reception protocol processor 32 includes a packet receiver 321, a reception packet buffer 322, and a packet to data converter 323. Reception protocol processor 32 performs data transmission in cooperation with transmission protocol processor 14 on the opposite equipment side.

In the case of the above-mentioned structure, no means is provided for informing digital video camera terminal 1 of a packet loss when any packet is lost during the transmission through moving image transmission network 2. Moreover, because the packet is deleted when the packet transmission from transmission packet buffer 142 is completed, it is not possible to restore the lost packet. Accordingly, it is not possible to guarantee the encoded binary data of the moving image to be stored in a complete form into moving image data storage 33.

[A System Example Guaranteeing No Loss of Moving Image Data]

Figure 2:
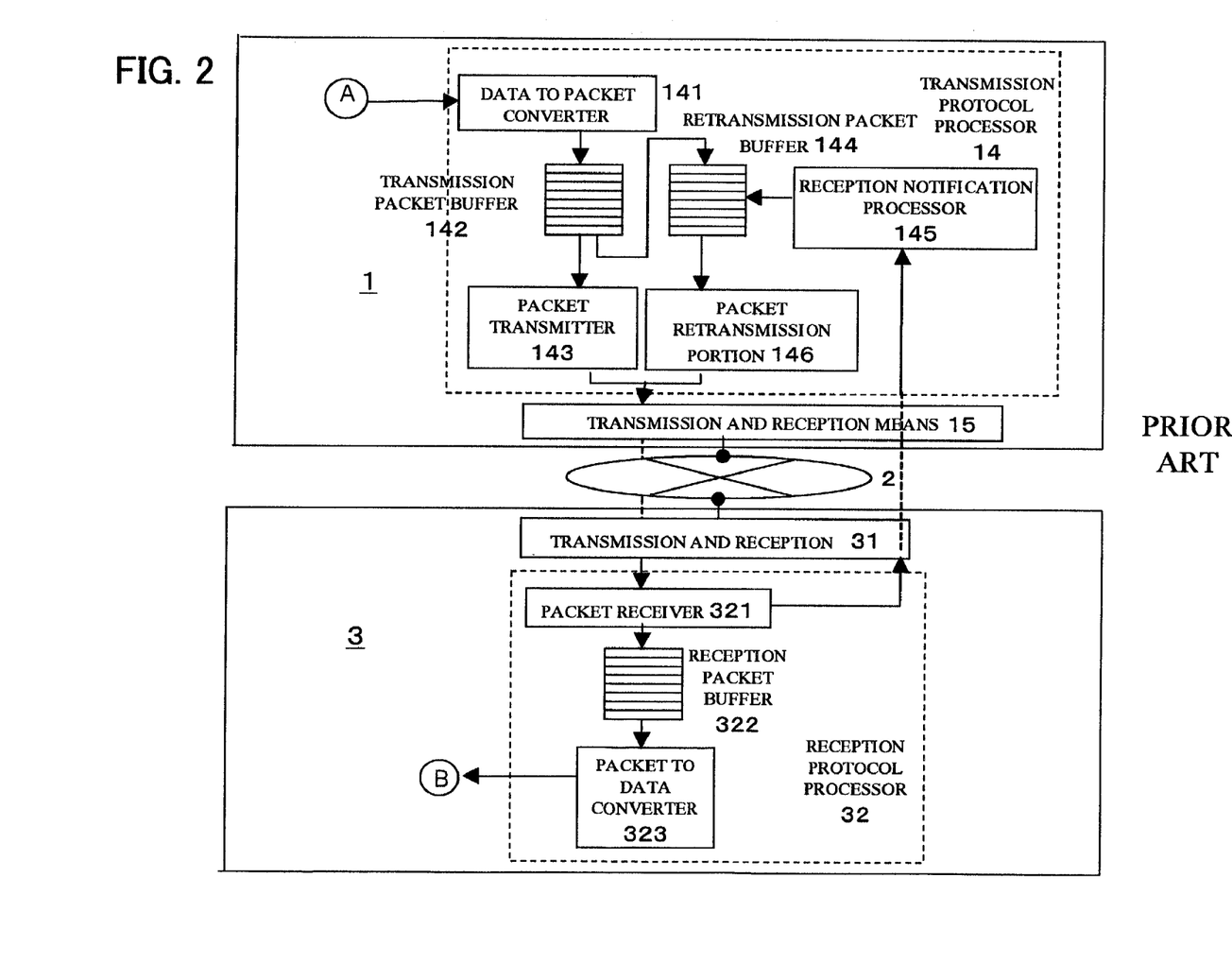
FIG. 2 shows a diagram illustrating another example of a network server storage system for moving images obtained by combining other existing technologies.

In FIG. 2, there is shown an example of a network server storage system for storing moving images constituted by combining existing technologies in a different form. This system configuration guarantees completeness in the data stored in moving image storage server 3, while the real-time transmission is not guaranteed.

In FIG. 2, (A) and (B) respectively corresponds to (A) and (B) in FIG. 1. Further, the configurations in FIG. 2 and FIG. 1 have similar structure except transmission protocol processor 14 and reception protocol processor 32. Therefore, image input portion 11, voice input portion 12, and moving image data storage 33 are omitted in FIG. 2. Hereafter features of the system configuration shown in FIG. 2 will be explained, as compared with the system configuration shown in FIG. 1.

The operation is basically the same as the system shown in FIG. 1. However, in place of transmission protocol processor 14 and reception protocol processor 32 having no retransmission function of lost packets, transmission protocol processor 14 and reception protocol processor 32 having a retransmission function of lost packets is employed in the system shown in FIG. 2. In regard to the transmission protocol having high reliability with the retransmission processing function incorporated thereto, for example, the connection type of TCP (Transmission Control Protocol) is applicable.

Data to packet converter 141 generates a packet from binary data of moving image to store into transmission packet buffer 142. The packet includes a sequence number indicating packet sequence. The packet is forwarded to transmission and reception means 15 by packet transmitter 143, and at the same time the packet is copied into a retransmission packet buffer 144.

In regard to the packet received through transmission and reception means 31 of the moving image storage server 3, packet receiver 321 refers to the sequence number of the received packet to detect any packet loss.

More specifically, when the sequence numbers are continuous, it is determined there occurs no packet loss and the related packet is stored into reception packet buffer 322. In addition, the last received sequence number (or, hereafter simply referred to as the received sequence number) is notified periodically to a reception notification processor 145 in transmission protocol processor 14.

Reception notification processor 145 refers to the received sequence number, and deletes from retransmission packet buffer 144 the packets having the identical sequence number and the packets having the sequence numbers older than the identical sequence number.

Meanwhile, when discontinuity of sequence numbers is detected in packet receiver 321, the last received continuous sequence number is reported to reception notification processor 145, and at the same time a packet retransmission request is issued.

Reception notification processor 145 then deletes the packets having older sequence numbers than the received sequence number from retransmission packet buffer 144. At the same time a packet retransmission portion 146 performs packet retransmission from retransmission packet buffer 144. When the re-transmitted packet(s) is forwarded to packet retransmission portion 146, the packet is stored into retransmission packet buffer 144 again. The packet is stored in the buffer until the reception confirmation is notified from packet receiver 321.

As described above, in the system shown in FIG. 2, a monitor means for monitoring any packet loss and a retransmission means for retransmitting the lost packet(s) are provided. Thus moving image binary data are stored completely in moving image data storage 33 without producing any loss. However, data to be transmitted are successively stored into transmission packet buffer 142 while the retransmission is carried out. Accordingly, if the bandwidth of moving image transmission network 2 is not sufficiently large, overflow of transmission packet buffer 142 may occur, causing a disadvantage of this method.

Therefore it is an object of the present invention to provide a network storage type video camera system to circumvent the disadvantage of the systems shown in FIGS. 1 and 2. The resolution principle of the present invention is to introduce separate processing for storing real-time data and for restoration of lost data, so as to realize the real-time data storage function and at the same time to obtain complete moving image data without producing data loss.

More specifically, because data storage function must be performed in real time, the transmission is carried out without conducting packet retransmission, neglecting packet losses in the network. Information related to the lost packet is notified to the transmission side.

At the transmission side, the notified information on the lost packet is locally preserved. After real-time recording is completed, the original data are restored using both the reception completion packet and the lost packet.

Figure 3:
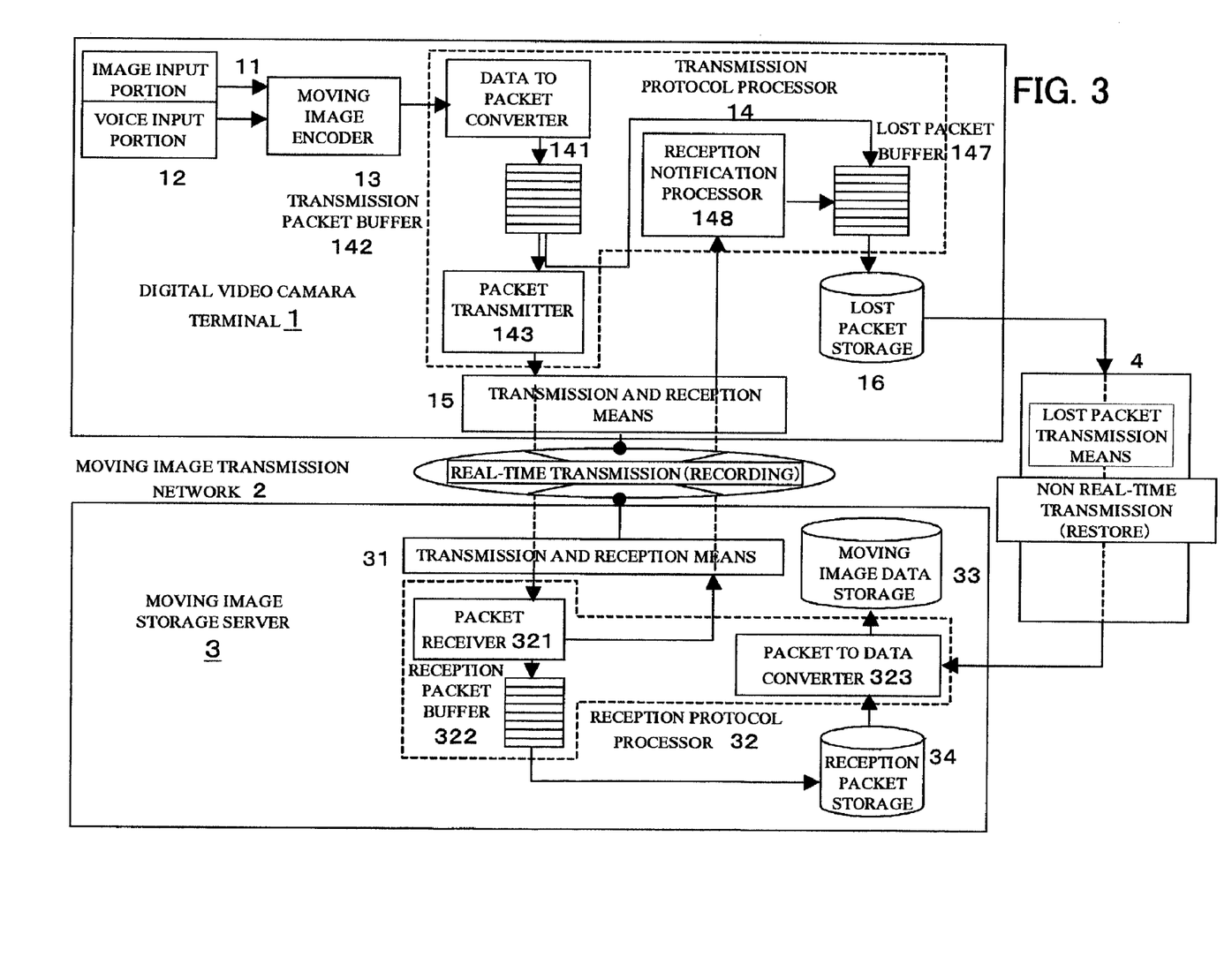
FIG. 3 shows an embodiment of network storage type video camera system employing the resolution principle of the present invention.

In FIG. 3, there is shown a diagram illustrating an embodiment of a network storage type video camera system to which the resolution principle of the present invention is applied.

FIG. 3 also illustrates a configuration example of a network server storage system for storing moving images to which the resolution principle of the present invention is applied. The network server storage system shown in FIG. 3 includes a digital video camera terminal 1, a moving image transmission network 2, a moving image storage server 3, and a lost packet transmission means 4.

In digital video camera terminal 1, the image and voice respectively input from image input portion 11 and voice input portion 12 is converted into binary data by moving image encoder 13. The converted binary data is read into transmission protocol processor 14, further to be divided into packets with added sequence number having a continuous number by data to packet converter 141.

The divided packets are sequentially stored into transmission packet buffer 142. Transmission packet buffer 142 stores a plurality of packets, to transmit to packet transmitter 143 in FIFO (First In First Out) order. At the same time the copy of transmitted packets are stored into a lost packet buffer 147.

The packet output from packet transmitter 143 is forwarded to moving image transmission network 2 by transmission and reception means 15. Moving image transmission network 2 is assumed to be wired public network, wireless public network, wireless LAN, and the Internet. Depending on the type of network 2, functional equipment required for communication corresponding to the network 2 is selected for transmission and reception means 15, as well as for transmission and reception means 31 on the side of moving image storage server 3.

In moving image storage server 3, the transmitted packet is received by packet receiver 321. The received packet is stored into reception packet buffer 322, and then the packet is read out in FOFO order to store into reception packet storage 34.

Simultaneously packet receiver 321 checks the packet sequence number. When no discontinuity is detected in the packet sequence number, packet receiver 321 transmits the last received sequence number (or simply referred to as the received sequence number) to a reception notification processor 148 on the digital video camera terminal 1 side.

Reception notification processor 148 can confirm from the received sequence number that the packets each having an older number than this received packet is correctly received on the moving image storage server 3 side. Therefore these packets are deleted from lost packet buffer 147.

On the other hand, when detecting discontinuity of the packet sequence number, packet receiver 321 notifies reception notification processor 148 of the last sequence number of the discontinuity range (or simply referred to as the lost packet sequence number). Reception notification processor 148 then copies into lost packet storage 16 the packets having no greater number than the lost packet sequence number (i.e. the packet having the lost packet sequence number and the previous packets) and at the same time deletes these packets from lost packet buffer 147.

Through the operation described above, the entire packets generated by data to packet converter 141 are stored either reception packet storage 34 or lost packet storage 16. Here, because the retransmission processing is not performed, real-time recording processing can be achieved.

After the image recording is completed, moving image restoration processing is carried out using the packets stored in reception packet storage 34 and lost packet storage 16. More specifically, on starting the restoration processing, packet to data converter 323 reads out packets in order of sequence number from both reception packet storage 34 and lost packet storage 16. Packet to data converter 323 then converts the packets to store moving image data storage 33.

The packet from lost packet storage 16 is transmitted through lost packet transmission means 4 to be referred by packet to data converter 323. As lost packet transmission means 4, a highly reliable network such as a cable connection network with TCP is employed. It is required for this means to have quite low possibility of producing data loss. Real-time transmission capability is not essentially required.

With the aforementioned processing, no loss of moving image data is guaranteed in the data stored in moving image data storage 33, thus the problem encountered in the systems shown in FIGS. 1 and 2 is solved.

Figure 4:
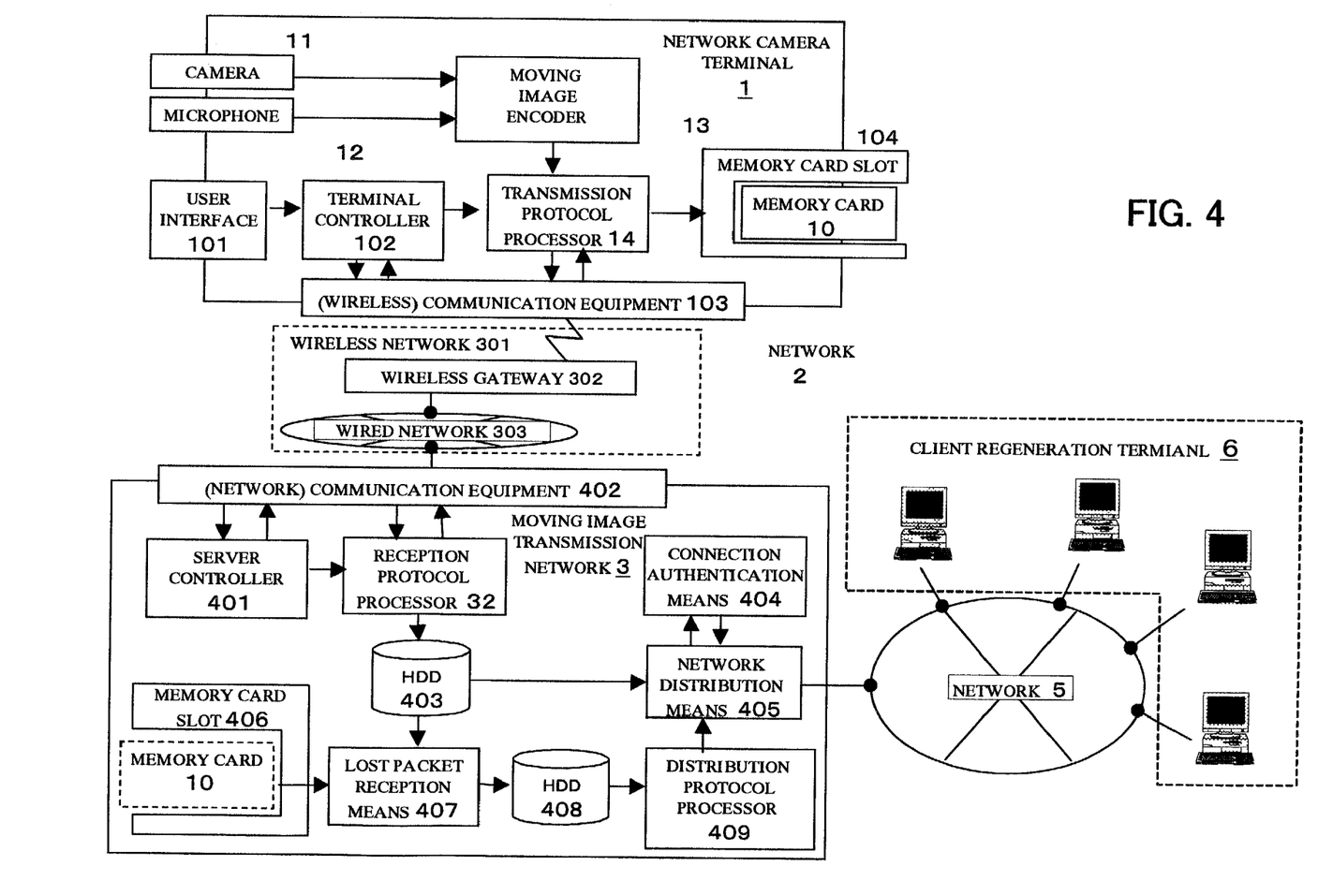
FIG. 4 shows a configuration diagram of an embodiment of a moving image live distribution system as an application of the present invention.
Figure 5:
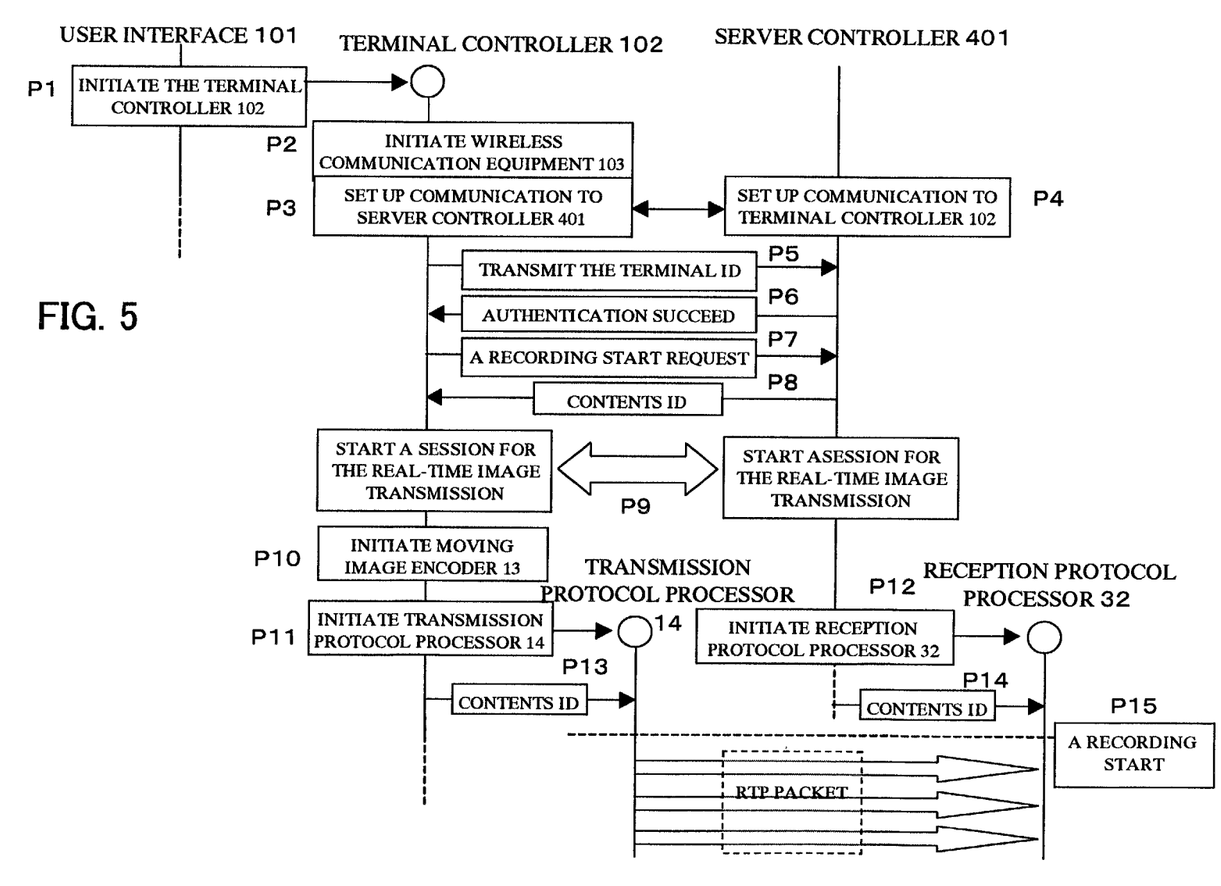
FIG. 5 shows a processing flow chart of the system shown in FIG. 4.

In FIG. 4, there is shown a configuration diagram of an embodiment in which the method of the present invention is applied to a moving image live distribution system. FIG. 5 shows a processing flowchart of the system shown in FIG. 4. Here, the process up to the start of image recording is illustrated.

The system includes network camera terminal 1, memory card 10, network 2, moving image storage server 3, network 5, and client regeneration terminal 6. The purpose of the system is to provide a function of recording moving images captured by network camera terminal 1 in real time into moving image storage server 3, as well as a function of distributing the images to client regeneration terminal 6.

The system also has a function of re-distributing the moving images recorded in moving image storage server 3 to client regeneration terminal 6 upon request.

To enable these functions, network camera terminal 1 is connected to moving image storage server 3 through network 2. Further, a plurality of client regeneration terminals 6 is connected to moving image storage server 3 through either network 2 or another network 5.

The operation of the system shown in FIG. 4 is described hereafter referring to the processing flowchart shown in FIG. 5. First, in network camera terminal 1, on receipt of a recording request from the terminal user through a user interface 101 (procedure P1), a terminal controller 102 initiates wireless communication equipment 103 (procedure P2).

Figure 6:
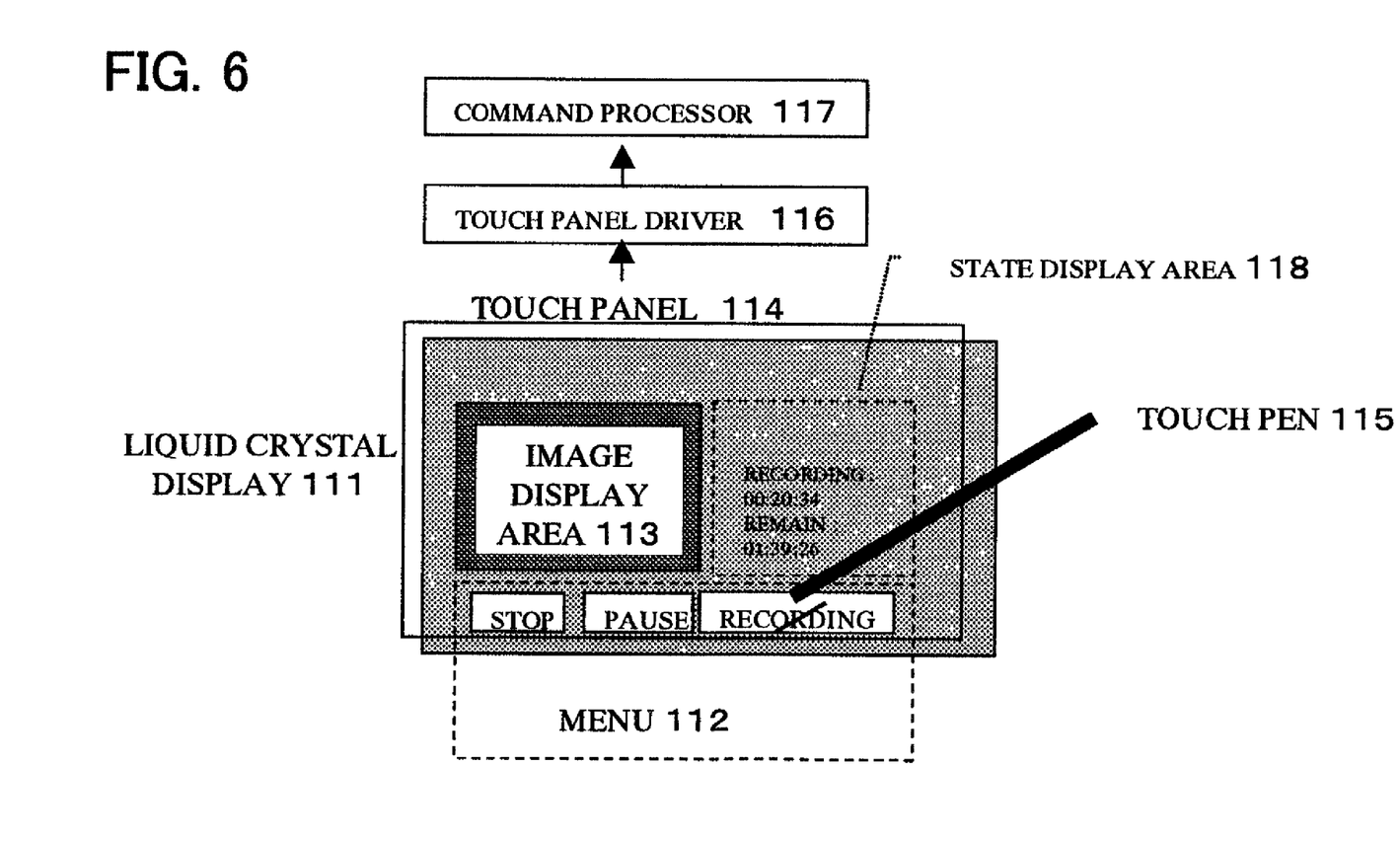
FIG. 6 shows a diagram illustrating an embodiment of user interface 101.

User interface 101 has a liquid crystal display 111, on which a menu 112 and an image currently being captured in an image display area 113. A transparent touch panel is disposed being overlaid on liquid crystal display 111. When a touch pen 115 taps the screen, a touch panel driver 116 detects the location. A command processor 117 then performs a processing corresponding to the location and the selected menu.

Terminal controller 102 includes control software and a microprocessor. Wireless communication equipment 103 analyses a communication command (AT command, etc.) output from terminal controller 102, to connect a wireless route to the specified wireless gateway 302 on a wireless network 301. Thus terminal controller 102 sets up communication to a server controller 401 through network communication equipment 402 (procedure P3), server controller 401 sets up communication to terminal controller 102 (procedure P4).

Next, terminal controller 102 performs a negotiation in respect of recording with server controller 401 in moving image storage server 3 through wireless network 301, wireless gateway 302, and wired network 303 respectively constituting network 2.

The negotiation is carried out in the following procedure: Terminal controller 102 transmits the terminal ID to server controller 401 (procedure P5). Server controller 401 verifies the terminal ID, and when the verification succeeds, 'authentication succeeded' is notified to terminal controller 102 (procedure P6). When the authentication succeeded, terminal controller 102 transmits a recording start request to server controller 401 (procedure P7).

Server controller 401 then transmits a contents ID for recording to terminal controller 102 (procedure P8). Here, the contents ID denotes an identification number for each moving image to be recorded. This ID is uniquely set on a moving image data basis.

In such a manner, when the negotiation is completed, terminal controller 102 and server controller 401 start a session for the real-time moving image transmission (procedure P9). Terminal controller 102 initiates moving image encoder 13 and transmission protocol processor 14 (procedure P10, P11). Meanwhile, server controller 401 initiates reception protocol processor 32 (procedure P12).

Terminal controller 102 transmits to transmission protocol processor 14 the contents ID previously received from server controller 401 in procedure P8 (procedure P13). Similarly, server controller 401 transmits the contents ID to reception protocol processor 32 (procedure P14), and then the recording is started (procedure P15).

Here, camera 11 is a video camera employing CMOS or CCD device. Camera 11 transmits the captured digital YUV signals to moving image encoder 13. At the same time microphone 12 generates voice-sampled PCM signals to transmit moving image encoder 13. Moving image encoder 13 is equipment for encoding moving images into formats such as MPEG4 and H. 263, which can be configured with hardware or software.

Figure 7:
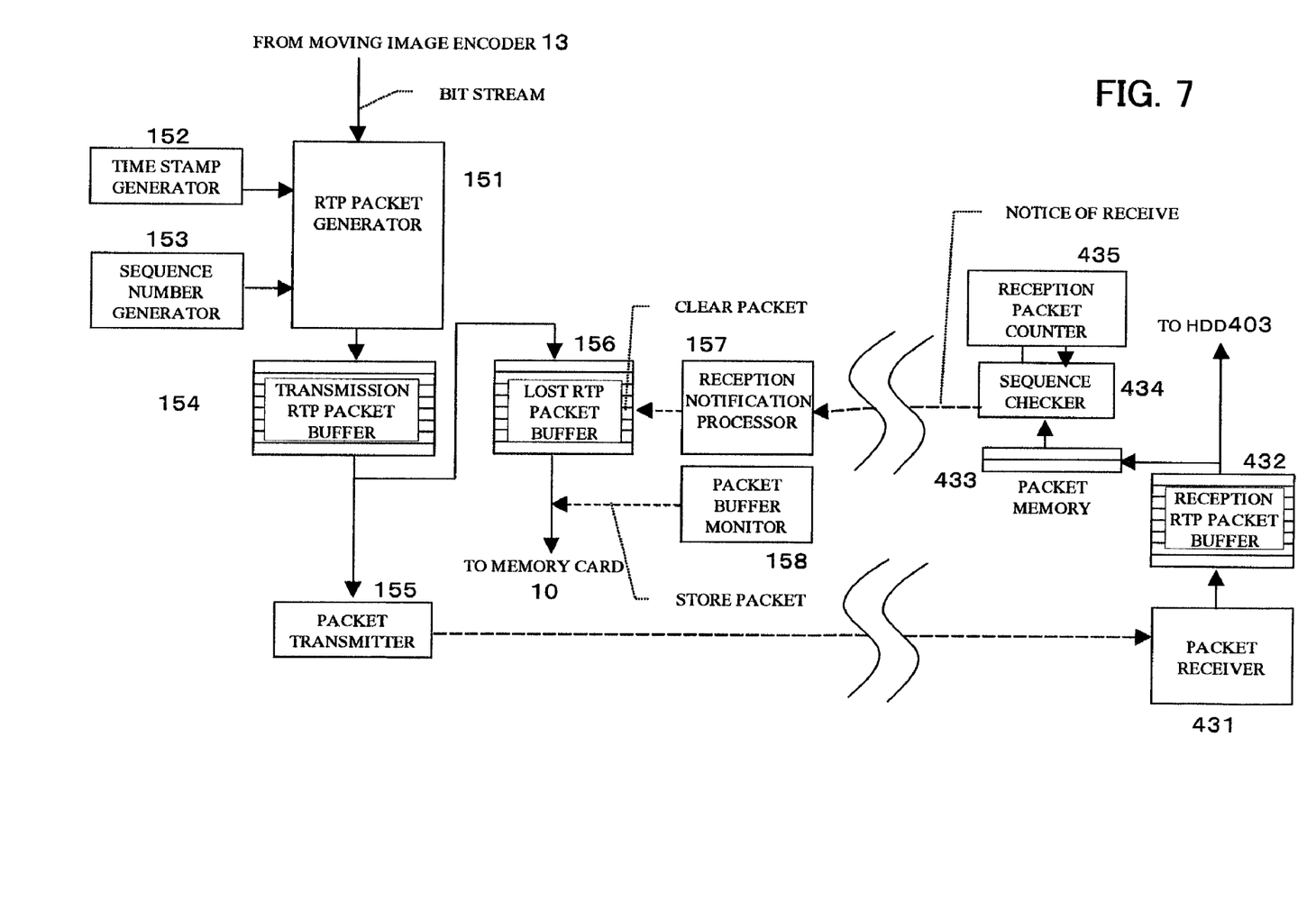
FIG. 7 shows a functional configuration of transmission protocol processor 14 and reception protocol processor 32.

Transmission protocol processor 14 and reception protocol processor 32 have a functional configuration shown in FIG. 7. In this figure, the portion other than functional configuration of transmission protocol processor 14 and reception protocol processor 32 is omitted. The left side portion denotes the functional configuration of transmission protocol processor 14, while the right side portion denotes the functional configuration of reception protocol processor 32.

Bit stream of the moving image produced by moving image encoder 13 is converted into RTP (Real-time Transport Protocol) packet by an RTP packet generator 151. RTP packet has a sequence number consisting of 16 bits of natural number, which is numbered in order of packet transmission, in the header part, and also a time stamp consisting of 32 bits indicating the transmission time when the first byte of the packet has been transmitted.

Figure 8:
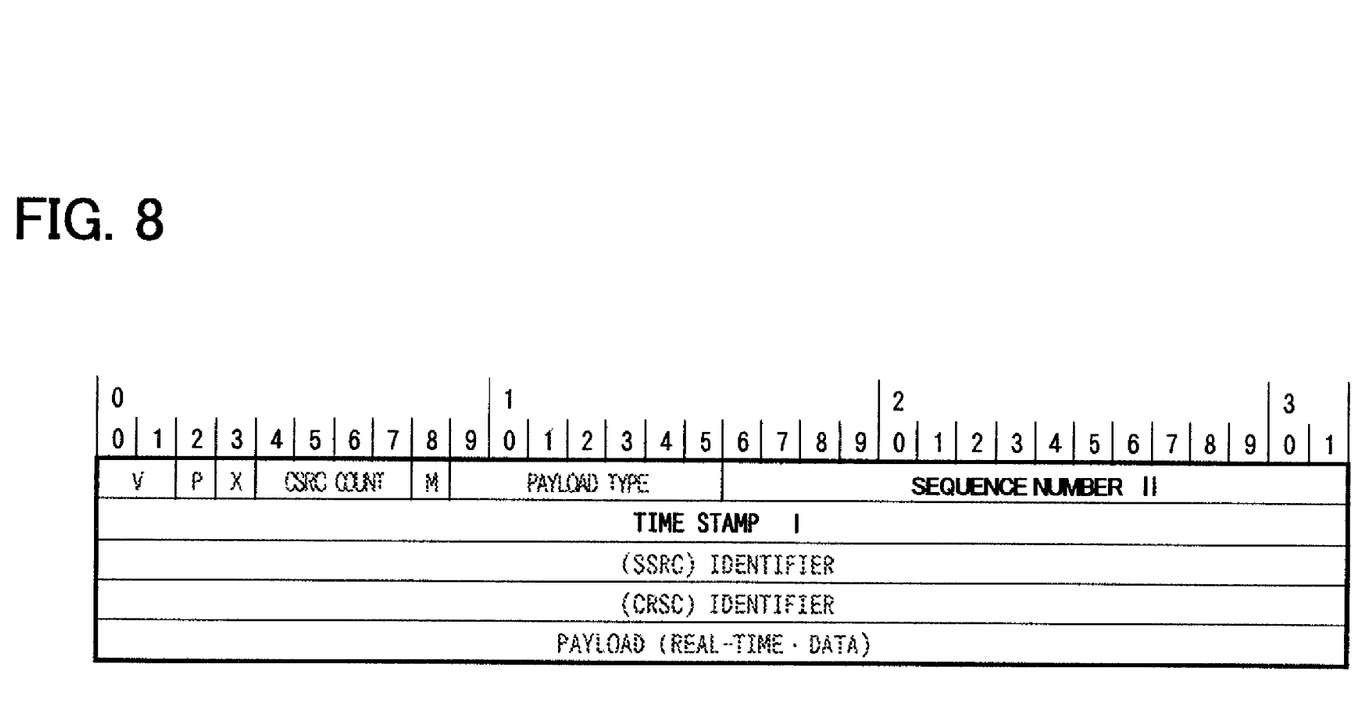
FIG. 8 shows a diagram illustrating the RTP packet format.

RTP packet structure is shown in FIG. 8. Time stamp I denotes the image recording time being managed by a time stamp generator 152, and sequence number denotes the packet sequence being managed by a sequence number generator 153. These information sets are added into the packet at an appropriate time.

RTP packet is stored into a transmission RTP packet buffer 154. Packet buffer 154 has FIFO structure with which the packet stored first is read out first. The read out packet is deleted from packet buffer 154.

When a packet transmitter 155 reads out a packet from transmission RTP packet buffer 154, the packet is copied into a lost RTP packet buffer 156 simultaneously. Thus the copy of the RTP packet transmitted to moving image storage server 3 is backed up temporarily by storing in lost RTP packet buffer 156.

RTP packet is transmitted from packet transmitter 155 to a packet receiver 431 in reception protocol processor 32 through network 2 and communication equipment 103, 402. Packet receiver 431 stores the received RTP packet in a reception RTP packet buffer 432. The stored RTP packet is successively transferred to store into a hard disk (HDD) 403.

The output of the reception RTP packet buffer 432 is simultaneously stored in a packet memory 433. Packet memory 433 is controlled so that the newest two (2) packets only are stored. When a new packet is stored in packet buffer 433, sequence checker 434 compares the sequence numbers and the time stamps in the headers of the two RTP packets. If the sequence numbers are continuous, it is determined there is no packet loss, while if the sequence numbers are not continuous, then it is determined packet loss occurred.

Figure 9:
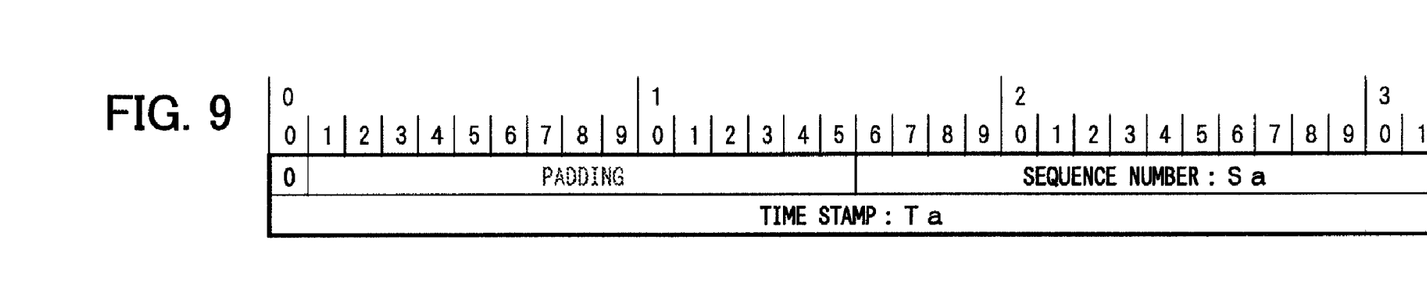
FIG. 9 shows a diagram illustrating an example of reception notification information (part 1).

A reception packet counter 435 counts the number of received packets. When the number reaches a predetermined constant P (where P is less than the number of packets which can be stored in lost RTP packet buffer 156), reception packet counter 435 makes an interruption onto sequence checker 434. On occurrence of the interruption, sequence checker 434 refers to packet memory 433 to generate reception notification information from time stamp Ta and sequence number Sa included in the newest RTP packet. An example of reception notification information is shown in FIG. 9. When this reception notification information is transmitted to a reception notification processor 157, reception packet counter 435 is cleared.

Figure 10:
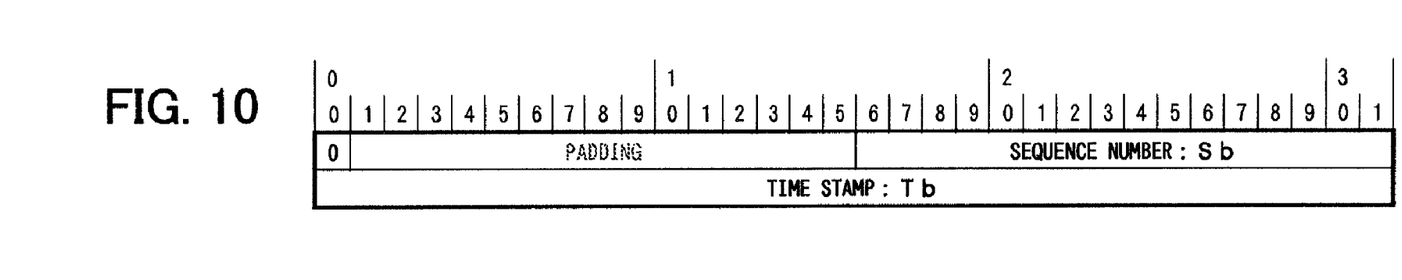
FIG. 10 shows a diagram illustrating an example of reception notification information (part 2).

Sequence checker 434 performs the following processing when any packet loss is found. First, reception notification information shown in FIG. 10 is generated from time stamp Tb and sequence number Sb of the older RTP packet stored in packet memory 433 to inform to reception notification processor 157. (Here, the older RTP packet means the RTP packet having smaller sequence number and smaller time stamp value.)

Figure 11:
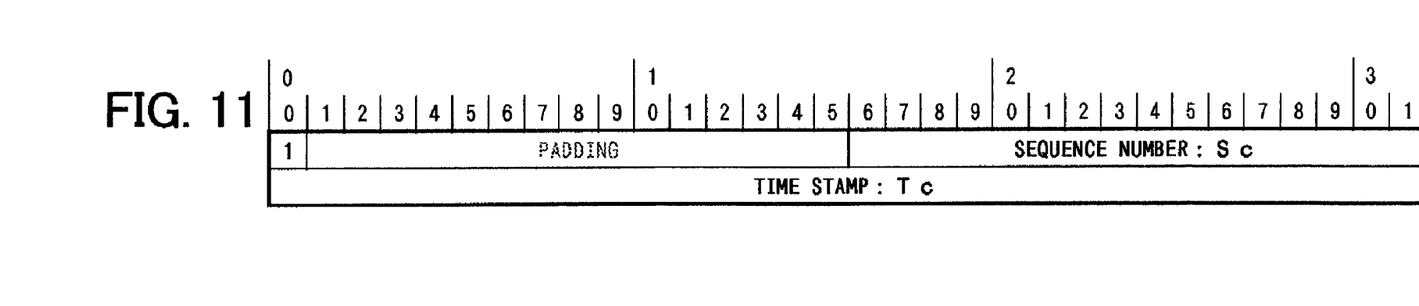
FIG. 11 shows a diagram illustrating an example of reception notification information (part 3).

Sequence checker 434 generates reception notification information, shown in FIG. 11, from time stamp Tc and sequence number Sc in the newer RTP packet in packet memory 433, to transmit reception notification processor 157. (Here, the newer RTP packet means the RTP packet having a larger sequence number and a larger time stamp value.)

After the above-mentioned two reception notification information sets (FIGS. 10, 11) are transmitted to reception notification processor 157, sequence checker 434 clears reception packet counter 435.

Reception notification processor 157 performs the following processing depending on the two cases of the reception notification information generated by sequence checker 434.

Figure 12:
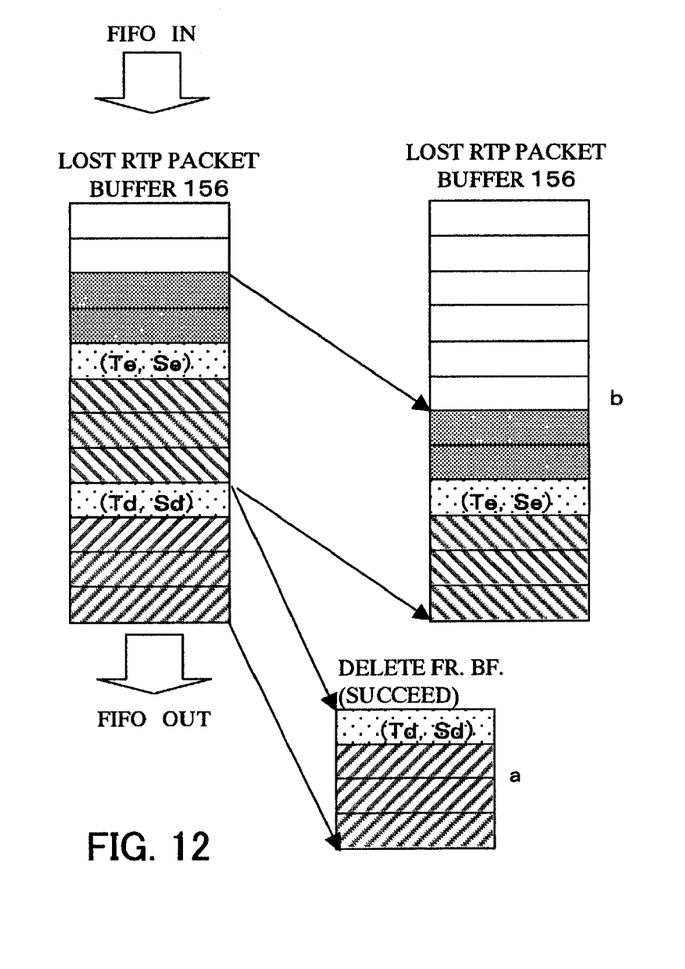
FIG. 12 shows a diagram of processing when transmission succeeded where Td is a time stamp of the reception notification information and Sd is a sequence number thereof.

In FIG. 12, there is shown processing being performed when the first bit of the first word in the reception notification information is '0' where the information also includes time stamp Td and sequence number Sd. In this case reception notification processor 157 searches the RTP packet having time stamp Td and sequence number Sd, referring to lost RTP packet buffer 156.

The RTP packet, of which time stamp and sequence number coincides with the above condition, and the packets having been received earlier than the packet of interest in the FIFO structured buffer (refer to FIG. 12a) are regarded that the transmission is successfully completed. Therefore these packets are deleted from lost RTP packet buffer 156. Thus the contents of lost RTP packet buffer 156 become as shown in FIG. 12b.

Meanwhile, when the packet of interest is not found, it is regarded that the packet of interest is already deleted from lost RTP packet buffer 156, and therefore no processing is done.

Figure 13:
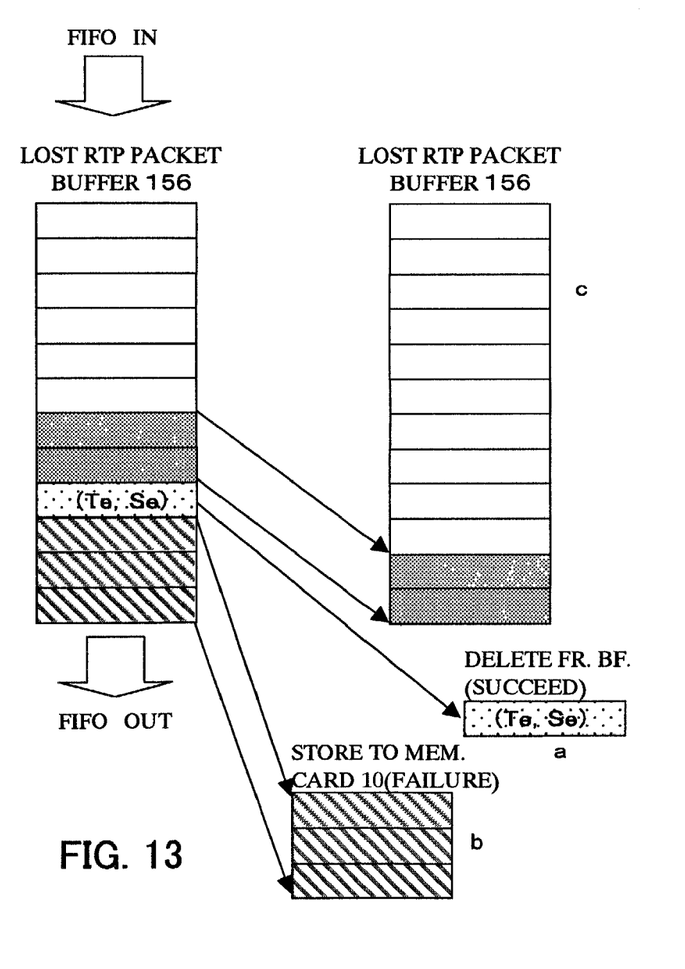
FIG. 13 shows a diagram of processing when transmission failed where Te is a time stamp of the reception notification information and Se is a sequence number thereof.

In FIG. 13, there is shown processing being performed when the first bit of the first word in the reception notification information is '1' where the information also includes time stamp Te and sequence number Se. In this case reception notification processor 157 searches the RTP packet having time stamp Te and sequence number Se referring to lost RTP packet buffer 156.

When the packet of interest is found, the packet is deleted from lost RTP packet buffer 156 (refer to FIG. 13a). The packets having been stored earlier than the packet of interest in the FIFO structured buffer, the packets of interest are regarded that the packet reception is not successful. These packets are stored in a memory card 10 being inserted in memory card slot 104 (refer to FIG. 13b and FIG. 4). Thus the contents of lost RTP packet buffer 156 becomes as shown in FIG. 13c.

Meanwhile, when the packet of interest is not found, it is regarded that the packet of interest is already deleted from lost RTP packet buffer 156, and therefore no processing is done.

A packet buffer monitor 158 supervises lost RTP packet buffer 156 for buffer overflow as well as RTP packet timeout.

When the residual portion of lost RTP packet buffer 156 falls below predetermined value (for example 10%), the predetermined number (for example, the quantity corresponding to 10%) of RTP packets is read out to store into memory card 10 so as to prevent the buffer overflow. Also, each time stamp of the stored RTP packets is monitored and the packets of which duration is longer than a predetermined value (for example 1 second) are stored into memory card 10.

Memory card 10 is connected to network camera terminal 1 via memory card slot 104. Regarding memory card 10 in which the contents ID and RTP packet are stored, a recording device such as smart media, compact flash, or memory stick (trade mark) is applicable.

Here, image-recording time of network camera terminal 1 depends on the capacity HDD 404 which is a recording medium in the network, or the capacity of memory card 10. The image recording time of network camera terminal 1 is determined by the loss rate of RTP packets in network 2. However because it is not possible to predict the loss rate accurately, the exact recording time cannot be calculated. Therefore the residual image recording time is calculated through the following processing to display to the user.

It is assumed that the storage capacity of HDD 404 is Rs (T) bytes and the capacity of memory card 10 is Rc (T) bytes, and that the total transmission quantity of RTP packets per 1 sec (second) through a predetermined time (for example 10 sec) up to the time T is Ps (T) bytes/sec, and a lost number of RTP packets per 1 sec is Pl (T) bytes/sec. If the recording is performed under the above-mentioned loss rate condition, the residual recording time into HDD 40, As (T) sec, is derived from the following formula. In other words, after As (T) sec recording becomes impossible.

$$As\ (T) = Rs(T)/(Ps(T) - Pl(T)) \quad (1)$$

Similarly, the elapse of time, Ac(T) sec, to which a lost packet becomes unable to store into memory card 10 is;

$$Ac(T) = Rc(T)/Pl(T) \quad (2)$$

Therefore, the residual recording time A(T) sec at the time T is the smaller values of the two, As(T) or AC(T), which is shown by the following formula.

$$A(T) = \text{MIN}\ (As(T), Ac(T)) \quad (3)$$

With a varied packet loss rate in network 2, the residual recording time will also vary. When communication is disconnected in network 2, all packets are stored in memory card 10. Therefore, the time corresponding to local image recording time becomes the residual image recording time.

In the case when there is no packet loss at all, all packets are to be stored in HDD 404. Therefore the image recording time does not depend on the capacity of memory card 10.

Terminal controller 102 periodically calculates the aforementioned image recording time to display in a state display area 118 on liquid crystal display 111 of user interface 101, using either text or graphic chart form.

HDD 403 stores the received contents ID and RTP packet in real time. At the same time, the RTP packet is distributed in real time to client regeneration terminal 6 through network 5 by network distribution equipment 405 (the live distribution service).

Client regeneration terminal 6 connected to network 5 transmits the terminal ID to moving image storage server 3. Moving image storage server 3 verifies the terminal ID using a connection authentication means 404. When the authentication is successful, the connection is established to start the moving image distribution using the RTP session.

On user interface 101, when the user selects a menu of recording completion from a menu 112, terminal controller 102 notifies server controller 401 of the recording completion. Thereafter terminal controller 102 completes the RTP session in use for the moving image communication, and wireless communication equipment 103 disconnects the connection line.

When an RTP packet is left in lost RTP packet buffer 156 (FIG. 7), the packet is stored in memory card 10 then the entire processing is completed.

In moving image storage server 3, on receipt of the recording completion, server controller 401 stores the entire RTP packets stored in reception RTP packet buffer 432 into HDD 403, and then performs RTP session terminating processing. Thus the image recording processing is completed.

On completion of real-time image recording, memory card 10 is removed from memory card slot 104 of network camera terminal 1. When the memory card 10 is inserted into memory card slot 406 of moving image storage server 3, a lost packet restoration portion 407 is initiated.

Lost packet restoration portion 407 refers to the contents ID stored in memory card 10, and then searches the RTD packet group having the same contents ID from HDD 403. By referring to RTP packet, time stamp and sequence number in memory card 10, lost packet restoration portion 407 sorts the searched packets in order of generated time.

Lost packet restoration portion 407 then extracts payloads from the sorted RTP packets to reconstruct to bit stream of the moving image, to store into HDD 408. This bit stream is identical to the bit stream generated by moving image encoder 13.

The bit stream being stored in HDD 408 is converted to RTP packets by a distribution protocol processor 409 when the bit stream is to be distributed to client regeneration terminal 6. The converted RTP packets are distributed from network distribution equipment 405 as in the case of live distribution. However, now the RTP packets are generated from the bit stream in which lost packets have been restored. Accordingly, it becomes possible to distribute the moving image having no loss once produced in network 2.

In the aforementioned embodiment, it may also be possible to transfer the lost packets through a network to moving image storage server 3 after the recording is completed, instead of physically connecting memory card 10 into memory card slot 406 of moving image storage server 3. Also it may be possible to perform the lost packet transfer processing during the recording, not after completing the recording.

In FIG. 7, there is shown a configuration diagram of an embodiment in which a lost packet is transferred to moving image storage server 3 through a network after recording is completed, as well as the lost packet transfer processing is carried out during recording.

Figure 14:
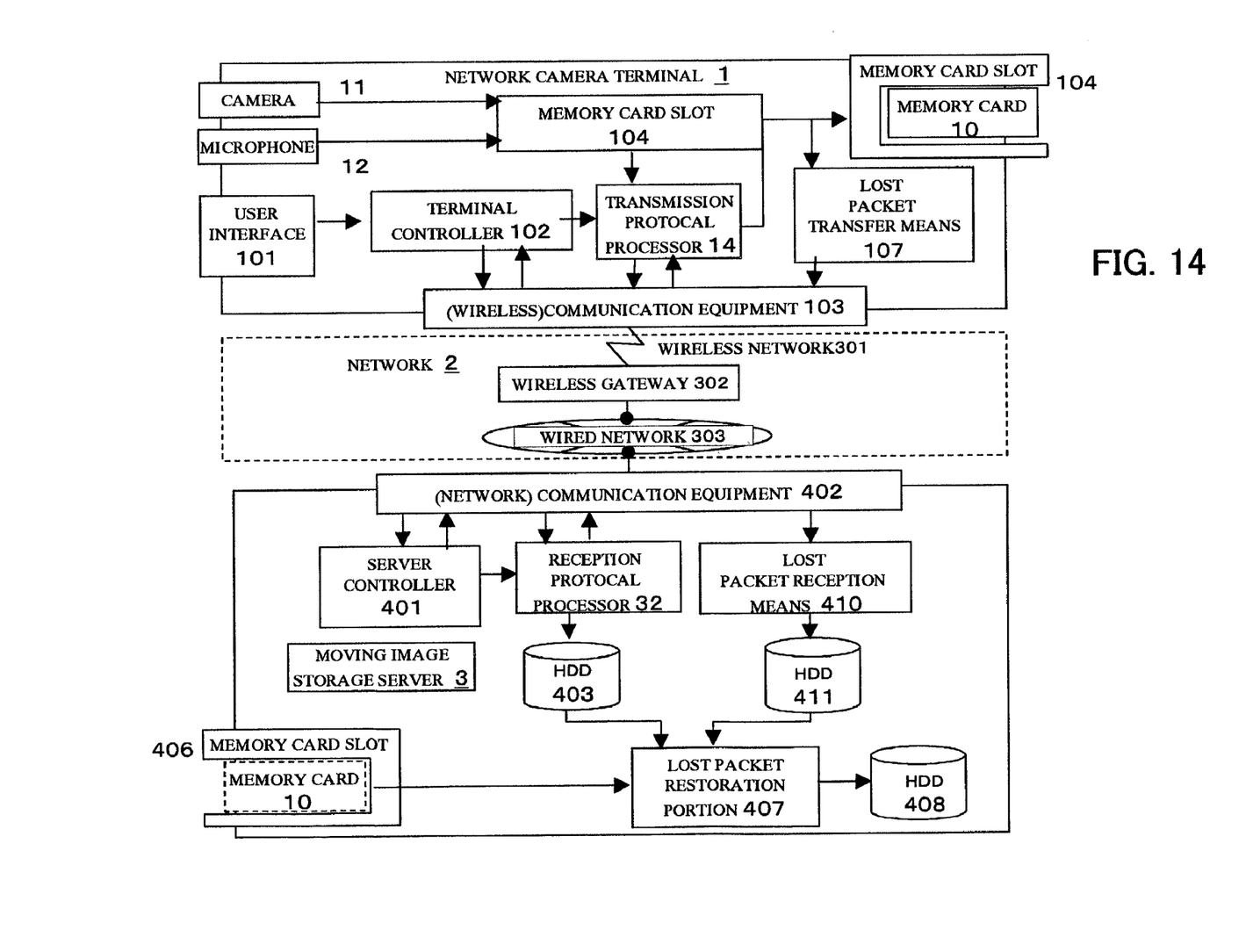
FIG. 14 shows a configuration diagram illustrating an embodiment of the case when transmitting a lost packet to moving image storage server 3 after the recording is completed, and the case when transmission procedure of a lost packet is performed during the recording.

Network camera terminal 1 includes a lost packet transfer means 107, in addition to the configuration of the embodiment shown in FIG. 4 explained earlier. Also, moving image storage server 3 includes a lost packet reception means 410 and an HDD 411. While recording is carried out, lost packet(s) stored in memory card 10 is transferred through network 2 to moving image storage server 3 between lost packet transfer means 107 and lost packet reception means 410. The connection type protocol such as TCP/IP is used for transferring the lost packet. Such procedures are explained hereafter in more detail.

[Lost Packet Transfer After Recording]

After recording is completed, the lost packet(s) stored in memory card 10 and the contents ID thereof are transferred to HDD 411 using lost packet transfer means 107 and lost packet reception means 410.

On completion of the transfer, lost packet restoration portion 407 is initiated. Lost packet restoration portion 407 looks into the packets stored in both HDD 403 and HDD 411 and compares the packets to find out a packet(s) having the same contents ID, to sort referring to time stamp and sequence number. The payload in the founded RTP packet is extracted to reconstruct a moving image bit stream to store into HDD 408.

In such a manner, moving image restoration in remotely located moving image storage server 3 is enabled without extraction and insertion of memory card 10.

[Lost Packet Transfer During Recording]

As mentioned above, it is possible to transfer a lost packet(s) even while the recording is on the way, by transferring the lost packet and the contents ID stored in memory card 10 to HDD 411 using lost packet transfer means 107 and lost packet reception means 410. This transfer is not required to perform in real time, therefore can be performed using the order of bandwidth not impeding the real-time transfer in RTP session.

The packet(s) having been transmitted is deleted from memory card 10 and is stored into HDD 411. The residual recording time possible to record locally in network camera terminal 1 becomes longer by the packet transfer time from memory card 10 to HDD 411 being obtained using the above-mentioned formula (2). The residual recording time left for further image recording is calculated appropriately using the formulae (1), (2) and (3), to display to user interface 101.

At the time recording is completed, if there is a lost packet(s) in memory card 10, the restoration may be performed either by inserting memory card 10 into memory card slot 406, or through network 2.

As the present invention having been described according to the drawings, moving images and voice can be recorded in real time into a server connected to a network. This real-time recording to the server on a network enables to realize miniaturization of a video camera and, at the same time, long time recording using thereof.

Further, an estimated residual image recording time is displayed by calculating using a packet loss rate in a network. This enables the user to know the residual recording time without being conscious of an uncertain network condition, resulting in affording the user improved operational convenience.

According to the present invention, it becomes possible to perform real-time recording and live distribution concurrently. Thus the application is not restricted to the live distribution where transferring in real time is required more than maintaining image quality. The present invention can be applied for producing service contents such as VOD (video on demand) distribution of moving images and a moving image download service where high quality in image is an important factor.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A network storage type video camera system comprising:
   camera terminal equipment for generating moving image data;
   a network; and
   a moving image storage server connected to the camera terminal equipment through the network,
   wherein the camera terminal equipment converts the generated moving image data into packets to transmit in real time to the moving image storage server;
   the moving image storage server stores received packets and then reports reception packet information on the received packets to the camera terminal equipment; and further,
   after real-time transmission of all of the packets converted from the generated moving image data from the camera terminal equipment is ended the camera terminal equipment retransmits lost packets which are stored in the camera terminal equipment and have been lost during the transmission to the moving image storage server, based on the reception packet information reported from the moving image storage server, so that the moving image storage server obtains the generated moving image data composed of the received and stored packets and retransmitted lost packets, and wherein the camera terminal equipment includes a storage means for storing packets for real-time transmission, from which lost packets to be supplied after the completion of the real-time packet transmission are obtained by deleting from the storage means the packets having been received by the moving image storage server according to the reception packet information reported from the moving image storage server, and a user interface for inputting an image capture order from a user, wherein a residual image recording time is estimated based on residual storage capacity of the camera terminal equipment, residual packet storage capacity of the moving image storage server, and the past record on both data transmission rate and data loss rate in the network, to display the residual image recording time onto the user interface.

2. The network storage type video camera system according to claim 1, wherein the moving image storage server restores the moving image data using both the packets being stored during the real-time packet transmission and the lost packets being supplied from the camera terminal equipment after the real-time transmission is completed.

3. The network storage type video camera system according to claim 1 wherein the camera terminal equipment includes a drive mechanism for receiving a memory medium to store the packets being supplied to the moving image sever after the completion of the real-time packet transmission to complement the lost packets having been lost during the real-time transmission; and the moving image storage server includes a drive mechanism for receiving the memory medium to read in stored packets being supplied to complement the lost packets having been lost during the real-time transmission.

4. The network storage type video camera system according to claim 1 wherein the estimation of residual recording time, A (T), is derived from the following formula;

$$A(T)=MIN(As(T),Ac(T))$$

where $$As(T)=Rs(T)/(Ps(T)-Pl(T)),$$

$$Ac(T)=Rc(T)/Pl(T),$$

and,

Rc (T): residual storage capacity of the camera terminal equipment (bytes),

Rs (T): residual packet storage capacity of the moving image storage server (bytes), Ps (T): number of transmission bytes to be transmitted within a predetermined period up to the time T in the network (bytes/sec), Pl (T): quantity of data loss rate in the network (bytes/sec).

5. The network storage type video camera system according to claim 2 further comprising a moving image regeneration terminal being connected to the moving image storage server through a network, for distributing to the moving image regeneration terminal a moving image being stored during the real-time recording, and for distributing a restored moving image having no loss after the recording is completed.

* * * * *